United States Patent [19]

Karr, Jr. et al.

[11] Patent Number: 4,643,390

[45] Date of Patent: Feb. 17, 1987

[54] FAIL-SAFE VALVE ACTUATOR

[75] Inventors: Michael A. Karr, Jr.; John M. Zwiegel, both of Houston, Tex.

[73] Assignee: Gray Tool Company, Houston, Tex.

[21] Appl. No.: 738,921

[22] Filed: May 29, 1985

Related U.S. Application Data

[63] Continuation-in-part of Ser. No. 705,576, Feb. 26, 1985.

[51] Int. Cl.⁴ .................... F16K 31/122; F16K 37/00
[52] U.S. Cl. ..................... 251/63.6; 251/337
[58] Field of Search ............ 251/63.6, 63.5, 337

[56] References Cited

U.S. PATENT DOCUMENTS

| | | | |
|---|---|---|---|
| 2,296,145 | 9/1942 | Christensen | 251/63.6 X |
| 3,378,224 | 4/1968 | Boyle | 251/63.6 X |
| 3,379,405 | 4/1968 | Natho | 251/63.6 X |
| 3,695,577 | 10/1972 | Jespersen | 251/337 X |
| 3,789,875 | 2/1974 | McGee | 251/63.6 X |
| 4,054,156 | 10/1977 | Bensen | 251/63.6 X |
| 4,423,748 | 1/1984 | Ellett | 251/63.6 X |
| 4,445,424 | 5/1984 | Foster et al. | 251/63.6 X |
| 4,526,341 | 7/1985 | Thomas | 251/63.5 |

FOREIGN PATENT DOCUMENTS 2115111 9/1983 United Kingdom .

*Primary Examiner*—Arnold Rosenthal
*Attorney, Agent, or Firm*—Troxell K. Snyder

[57] ABSTRACT

A fail-safe valve actuator includes a hydraulic piston (17) and cylinder (15) for driving the valve stem (9) and gate member (35) of a gate valve into a first flow control state responsive to sufficient pressure delivered by a fluid or gas supply line (92). Upon failure or other loss of sufficient control line pressure, a volute spring (7) drives the cylinder (15), and hence the stem (9) and gate member (35), axially outward resulting in the valve being moved into a second flow control state.

5 Claims, 5 Drawing Figures

4,643,390

FAIL-SAFE VALVE ACTUATOR

CROSS REFERENCE TO RELATED APPLICATIONS

This application is a continuation-in-part of commonly-assigned U.S. patent application Ser. No. 705,576, filed Feb. 26, 1985.

FIELD OF THE INVENTION

The present invention relates to a remotely operable actuator for a flow control valve or the like, and more particularly, to an actuator operable to move said valve into a desired flow control state upon failure or other removal of the actuator control influence.

BACKGROUND OF THE INVENTION

Remotely operable actuators for flow control valves are well known in the art of fluid distribution and control. Such valve-actuator combinations find their greatest utility in harsh environments, automatic flow distribution systems, and other circumstances wherein a human operator is not available to manually change the flow control status of the valve.

For control valves operable between a first flow control state and a second flow control state, such as a gate valve being operable between fully open and fully closed positions, it is common to use a controllable supply of pressurized hydraulic fluid as a control influence to cause an actuator to depress or withdraw the valve stem of a rising stem gate valve in order to selectably effect the opening and closing of the subject valve. One particular configuration utilizing pressurized hydraulic fluid involves a hydraulic piston or the like oriented coaxially with the rising stem and arranged so as to drive the stem either inwardly or outwardly responsive to the supply of sufficient hydraulic control fluid pressure. Such configurations typically also provide a return spring for driving the valve stem in the opposite direction upon release or failure of the pressurized control fluid supply.

Such valves, termed "fail-safe" due to the feature which returns the valve fluid flow control state to a known condition in the absence of adequate control fluid pressure, find particular utility in oil or gas production applications wherein it is very desirable to know the flow system configuration with certainty during periods of control system damage or equipment failure. For example, a fail-safe valve of the type discussed hereinabove may be placed in the main flow line of a remote gas or oil production or distribution facility and configured so as to typically remain hydraulically driven into the open flow control state by sufficient pressure hydraulic control fluid. During normal system operation, the main gas or oil line valve would remain open, possibly with other downstream valve-actuator combinations being used to direct and distribute the flow. Should a failure occur in the control system and control hydraulic pressure be lost, the main gas and/or oil line control valve would be urged into a closed position by the return spring, thus shutting off all flow to the downstream distribution system possibly preventing an overpressure, spill, equipment damage, or other undesirable consequences.

Prior art valve-actuator combinations of this general type are disclosed in UK Patent Application No. GB 2 115 111, dated Sept. 1, 1983, by Akkerman and Vazquez, and U.S. Pat. No. 3,789,875, dated Feb. 5, 1974 by McGee. Each of these cited documents shows a valve actuator which is operable to either raise or lower the valve stem of a rising-stem gate valve responsive to sufficient control fluid pressure and which further includes a spring means for driving the valve stem in the opposite direction upon release or other removal of the control fluid pressure.

As will be appreciated by those skilled in the art, it is desirable, for those applications wherein the ability of such valves to automatically move into a "failure" flow control state upon loss of control system pressure is important, that the return spring rapidly move the valve stem into the return position following loss of control pressure. This return motion is hindered by the inertia of the movable components of the valve and actuator, as well as any "sticking" or other mechanical drag due to the sliding of sealing surfaces. For hydraulically actuated valves utilizing a liquid control fluid, and particularly for such valves located at a great distance from the source of the control fluid, it will be appreciated that the fluid resistance resulting from the necessity of driving the hydraulic control fluid out of the actuator piston and back through the control fluid supply line can be quite large and can significantly increase the time required for the actuator to move the valve into the desired flow control state. It will also be appreciated that this mechanical resistance has the greatest magnitude at the instant of failure when the control fluid and actuator components are relatively static within. Once this inertial resistance has been overcome and the control fluid has begun to flow from the valve actuator, far less force is necessary to continue the movement of the valve stem into the "failure" position.

Additionally, it is common practice in some applications to run various types of equipment through the flow conduit and open valve, with any monitoring and retrieving of the equipment performed by a control wire running along the flow piping and through any intermediate gate valves. In such applications, it is intended that the emergency closure of the valve gate due to failure or other reason will sever any control wire which may be in use at the time. It is therefore imperative for those valves closed by spring force that the spring be sufficiently powerful to sever the control wire in addition to driving the gate member into the closed position.

Prior art actuators use helical coil springs which must be sized so as to provide adequate force when fully deflected for overcoming the combined inertial resistances of the control fluid and actuator. Once the valve stem is in motion under the influence of this type of spring, however, the constant spring rate of a coil spring results in unnecessary driving force being supplied to the valve stem. For valve actuators utilizing very strong coil springs for overcoming a high initial resistance, the actuator may be quite large and unwieldy.

It is occasionally necessary to access the bonnet retaining means of flow control valves for service, repair, or other purposes. For prior art valve actuators as discussed hereinabove, such access typically requires an almost complete disassembly of the valve-actuator combination. Such disassembly can require lengthy system shutdowns and a prolonged commitment of skilled personnel in order to ensure that such disassembly and subsequent reassembly have been correctly performed.

For actuators utilizing precompressed springs, disassembly and reassembly can be hindered by the need to either restrain or compress the actuator spring before releasing or securing the valve and actuator components. This problem is especially vexing for very powerful springs such as those used in applications wherein it is necessary to sever a conduit wire line or the like.

What is needed is a fail-safe actuator able to overcome the initial inertial resistance of the control fluid in the fluid supply line which is simple in design, compact in size, and permits quick and convenient disassembly and access for servicing.

SUMMARY OF THE INVENTION

The present invention provides a gate valve and a fail-safe hydraulic actuator therefor. The actuator is secured to the valve bonnet and includes telescoping hydraulic members for driving the valve stem and gate member axially inward upon introduction of sufficient pressure control fluid into an expandable control volume formed within the telescoping members.

Should control fluid pressure be released or otherwise fall to a low level, a spring disposed within the actuator causes the valve stem to be withdrawn, resulting in a predictable gate member position during periods of control or other failure. The spring, according to the present invention, is a volute spring having a spring rate that increases as the spring is compressed, reaching a maximum value as full compression is achieved.

The actuator is secured to the valve bonnet by an annular bonnet adapter ring cooperatively engaged between the valve bonnet and the actuator housing for preventing relative movement therebetween. The bonnet adapter ring may be selectably disengaged and moved aside for permitting access to the bonnet securing nuts without disassembling the valve-actuator combination. In addition, the actuator includes a pair of retainer rings, sized to engage the actuator housing and each end of the volute spring during disassembly of the actuator, for holding the volute spring captive within the housing in a compressed state.

It is therefore a feature of the present invention to provide a valve and actuator selectably operable between a first flow control state and a second flow control state.

It is further a feature of the present invention that the first flow control state is achieved only when sufficient hydraulic pressure is supplied to the valve actuator and, upon release of the control pressure due to failure or operator choice, the valve is automatically driven into the second flow control state.

It is still further a feature of the present invention that the means for automatically driving the valve into the second flow control state includes a volute spring having a spring rate that increases with increasing spring deflection for providing the greatest returning force when the valve is in the first flow control state.

It is also a feature of the present invention that the means for securing the valve actuator and valve provides access to the valve bonnet retaining bolts without requiring complete disassembly of the valve-actuator combination.

It is yet further a feature of the present invention to provide means for retaining a volute spring in a precompressed state during disassembly of the actuator for servicing.

BRIEF DESCRIPTION OF THE DRAWING FIGURES

DESCRIPTION OF THE PREFERRED EMBODIMENT

Figure 1:
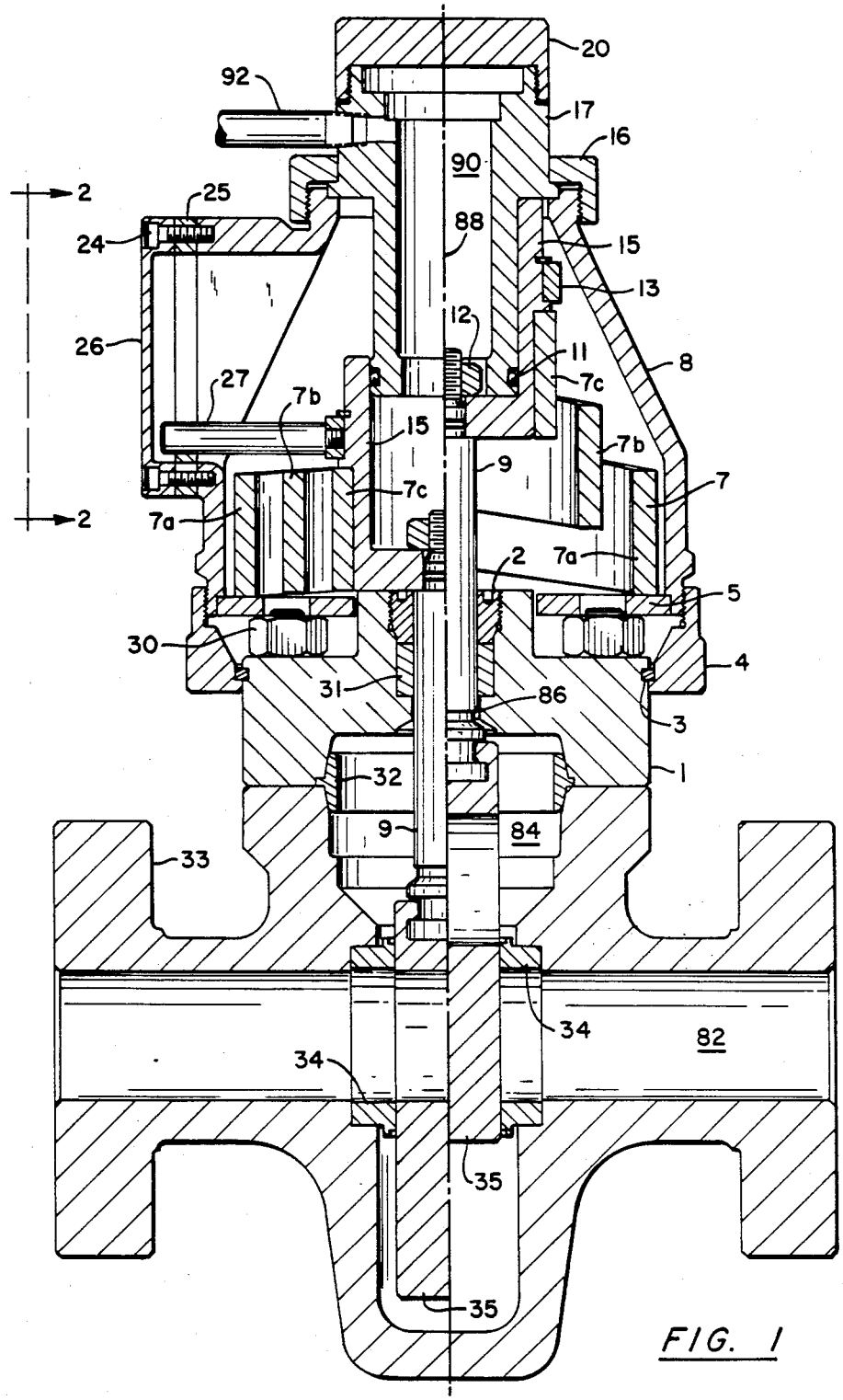
FIG. 1 is a cross sectional elevation of the valve and actuator according to the present invention.

Referring now to FIG. 1, a rising stem gate valve and an actuator according to the present invention will now be described. The valve comprises a valve body 33 having a flow passage 82 disposed therein. A gate member 35 is shown transversely reciprocatable with respect to the flow passage 82 between a lowered, open position (left half of FIG. 1) and a raised, closed position (right half of FIG. 1). Also shown are seat members 34 disposed around the flow passage 82 at the point of contact with the gate member 35 for providing sealing therebetween.

A valve bonnet 1 is shown secured to the valve body 33 by bolts 30 or other securing means known in the art. The bonnet 1 and body 33 form a valve cavity 84 opening into the passage 82 for receiving the gate member 35 as it reciprocates between a raised and lowered position. Sealing between the bonnet 1 and valve body 33 is a bonnet seal ring 32.

A valve stem 9 is shown cooperatively engaged with the gate member 35 and extending outwardly from the cavity 84 through a bore 86 disposed in the valve bonnet 1. Packing 31 surrounds the valve stem 9 for forming a fluid tight seal between the stem 9 and bonnet 1 while still permitting reciprocation of the valve stem 9 as shown in FIG. 1. A packing retainer nut 2 is shown threadedly engaged with the bonnet 1 for compressing and retaining the packing 31 during normal operation.

The actuator according to the present invention is best described with reference to the outer housing 8 which is shown secured to the valve bonnet 1 by the cooperative action of lock ring 3, bonnet adapter 4, and base plate 5. During assembly, the bonnet adapter 4 is dropped over the bonnet 1 and lock ring 3 secured about the bonnet 1. Next, base plate 5 and housing 8 are oriented as shown in FIG. 1 and the bonnet adapter ring 4 lifted outward and threadedly engaged with the housing 8 as shown in FIG. 1, and the assembly tightened securely by rotating bonnet adapter 4.

While the actuator according to the present invention may be secured to the operated valve and in particular to the bonnet 1 of such a valve by a variety of securing means well known in the art, the particular arrangement discussed hereinabove and shown in drawing FIG. 1 has the advantage of permitting access to the bonnet securing nuts 30 without complete disassembly and removal of the actuator. This is accomplished by unscrewing the bonnet adapter 4 from a completely assembled valve and actuator combination and dropping it down about the bonnet 1. The bonnet retaining bolts 30 are thus accessible by an open-end wrench and may be tightened or loosened as necessary.

Continuing with the description of the actuator according to the present invention, a piston 17 is shown disposed colinearly with the central axis 88 of the valve stem and in an outwardly axial location therefrom. The piston 17 is secured to the housing 8 by a retainer nut 16 which does not permit axial translation or rotation thereof. The piston 17 is in reality a cylindrical member, being closed about the outer end thereof by an end cap 20 as shown in FIG. 1.

Cylinder 15 is shown surrounding the piston 17 and telescopingly cooperable therewith. The cylinder 15 is secured about its inward end to the outward end of the valve stem 9 by hex nut 12. An annular piston seal ring 11 provides fluid tight sealing between the telescoping cylinder 15 and piston 17. Piston 17, end cap 20, and cylinder 15 define a control volume 90 which expands and contracts with the telescoping of the cylinder and piston 15, 17.

During operation, pressurized hydraulic fluid or gas is supplied to the control volume through the feed line 92. As is apparent from the foregoing discussion and the drawing figure, the pressurized hydraulic fluid or gas entering the control volume 90 will drive cylinder 15, and hence valve stem 9 and gate member 35, axially inward resulting in the valve as shown in FIG. 1 being opened to permit the free flow of material through the flow passage 82.

The actuator according to the present invention also includes spring means 7 for forcing the cylinder 15 axially outward upon removal of hydraulic pressure from within the control volume 90. According to the present invention, the spring means 7 is a volute spring, shown in FIG. 1 as having a plurality of rectangularly shaped blades 7a, b, c and being compressible between the cylinder 15 and the bonnet and base plate 1, 5.

Figure 3A:
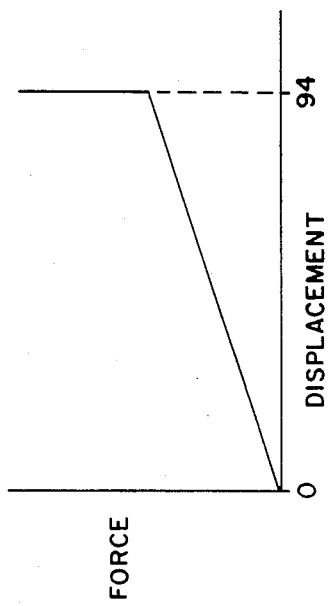
FIG. 3a is a force-displacement diagram for a standard helical coil spring.

The volute spring has particular utility in an actuator for this type of service as it has a variable spring rate which increases with increasing compression, reaching a maximum value when fully compressed as shown in the left half of FIG. 1. Moreover, as the blades 7a, b, c will "nest" as the spring is compressed, the fully compressed spring occupies nearly all of the available volume within the actuator housing 8 and presents a very low cross sectional height as compared to coil springs having similar maximum spring rates. The behavior of the volute spring 7 as used in the present invention may clearly be appreciated by a review of drawing FIGS. 3a and 3b which show the relation of compressive force and axial displacement for a standard coil spring and a volute spring, respectively. As will be noted, the amount of force necessary to compress a volute spring rises sharply as the compressive limit or bottoming point 94 is approached. For a standard coil spring, the relationship of force to distance is linear until the individual coils touch (i.e., bottom out).

Volute spring blades 7a, b, c, may be fabricated in a variety of cross-section including round, rectangular, trapezoidal, etc. Both blade shape and size may further vary over the length of the spring, thus allowing the spring rate to be particularly configured for a given application or environment. The rectangular shape shown in FIG. 1 has the advantages of relatively simple fabrication, lateral stability, and can be reshaped and/or cut down with relative ease.

Figure 3B:
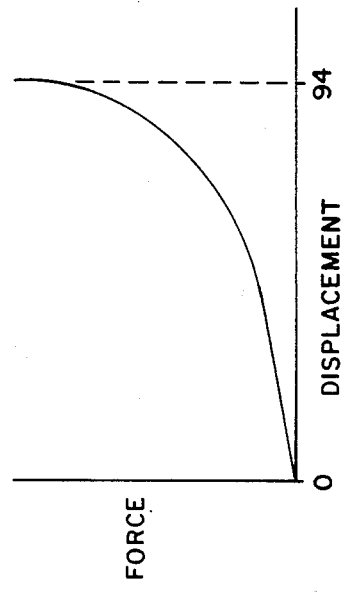
FIG. 3b is a force-displacement diagram for a volute spring.

Upon release of the hydraulic pressure holding the valve stem 9 and gate member 35 in the inward position representing a first flow control state, the volute spring 7 according to the present invention will exert its greatest force outwardly against the cylinder 15, compressing the control volume 90 and driving the hydraulic control fluid or gas back down supply line 92. As described in the preceding section, the inertial resistance to this movement is greatest at the time of first initiation, and diminishes as the back flow of fluid and component motion becomes established. With reference to FIG. 3b it can be seen that the volute spring 7 according to the present invention supplies the greatest force when it is most needed, and a diminishing force as the stem is placed in outward axial motion toward the second flow control state.

Figure 2:
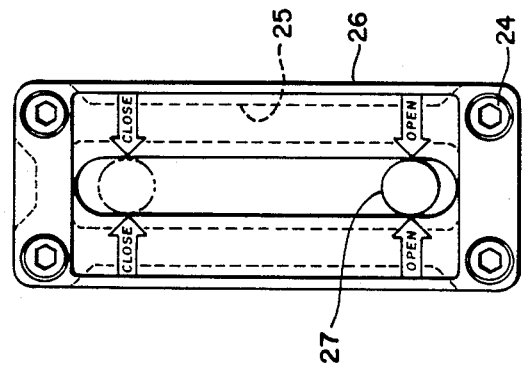
FIG. 2 is a view of the valve position indicating means as indicated in FIG. 1.

FIG. 1 also shows means for indicating the position of the gate member 35, which in the preferred embodiment is shown as a horizontal indicator rod 27, threadedly engaged with an indicator alignment ring 13 secured to the cylinder 15, and reciprocable therewith. Indicator rod 27 projects through the indicator guide plate 25 and is visible through a transparent lens 26 which is secured to the housing 8 by socket screws 24. FIG. 2 is a view of the position indicator means as indicated in FIG. 1 showing the appearance of the indicator rod 27 in the open position and, in phantom, in the closed position. Such an indicator means can have utility in the field by allowing a quick external verification of the state of the control valve from a distance and without the need to closely examine the valve mechanism.

Figure 4:
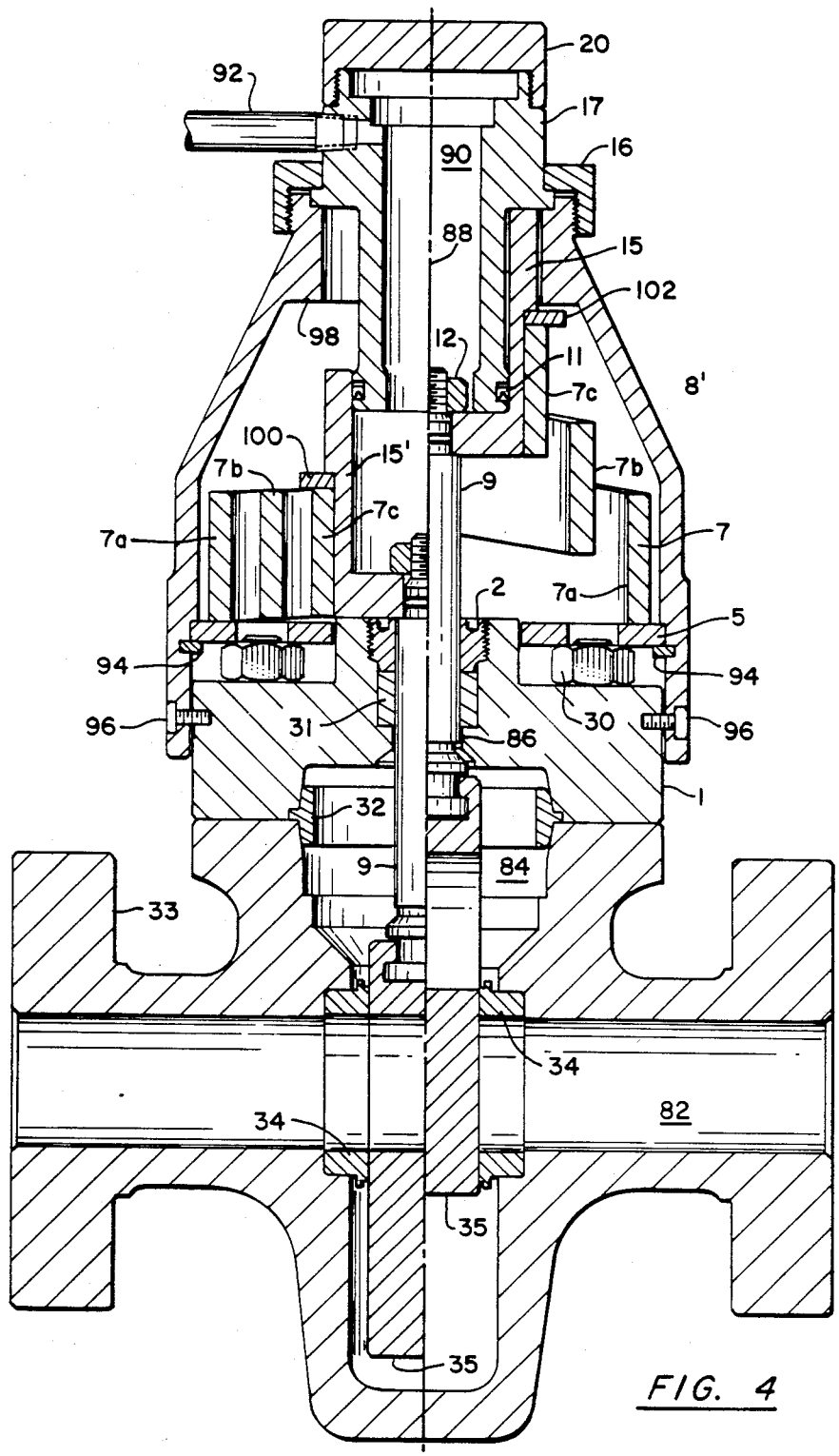
FIG. 4 is a cross sectional elevation of the valve and actuator showing means for retaining the volute spring in a precompressed state within the housing.

FIG. 4 shows a valve and actuator combination according to the present invention, including means for retaining the volute spring 7 within the housing 8' during disassembly for service or other purposes. The valve and actuator combination shown is basically identical to that of FIG. 1, and thus identical components have been designated with corresponding reference numerals. Actuator components having slightly different configuration but performing substantially the same function as the same corresponding components in FIG. 1 are designated by the same reference numeral but including a superscripted prime symbol, hence the housing 8 corresponds to the housing 8' of FIG. 4 and cylinder 15 to cylinder 15' in FIGS. 1 and 4, respectively. The valve stem position indicating means 24, 25, 26, 27 of FIG. 1 have not been included in FIG. 4 for improved clarity.

Referring now only to FIG. 4, the means for retaining the volute spring 7 under a preload within the housing 8' during disassembly will be described in detail. The lower end of the housing 8' includes an annular locking groove 92, opening radially inward, for receiving a plate retaining spring ring 94. The plate retaining ring 94 extends radially into the housing for engaging and locking the base plate 5 within the housing 8'.

The upper end of the alternative housing 8' includes a shoulder portion 98 projecting radially into the housing interior. Cylinder 15' also now includes an annular shoulder 100 which engages an upper spring retainer ring 102. The upper spring retainer 102 contacts the innermost portion 7c of the volute spring 7 and transfers the outwardly directed spring force to the cylinder shoulder 100 and hence the cylinder 15'.

The function of the retaining rings 94, 102, the shoulders 98, 100, and the locking groove 94 in keeping the volute spring captive during actuator disassembly should now be apparent. A typical disassembly sequence would begin by releasing retainer nut 16 and withdrawing the piston 17 from the actuator. Following removal of the piston 17, cylinder 15' is released by removing the hex nut 12 from the valve stem 9, permitting withdrawal of the cylinder 15' by slipping it axially outward of the housing. Packing retainer nut 2 may now be removed to allow replacement of the stem packing 31.

Referring particularly to the right half of FIG. 4 showing the closed valve-actuator assembly, it can be seen that the upper spring retainer 102 extends radially outward for engaging the housing shoulder 98, thus preventing further extension of the volute spring 7. Removal of the actuator is then completed by disengaging the housing retainer screws 96 and lifting off the housing 8' with the volute spring 7 retained therein. Reassembly of the actuator is accomplished by reversing the foregoing actions.

The advantages of the alternative housing embodiments described hereinabove include the ability to allow removal and replacement of the actuator components without having to contend with releasing or precompressing the volute spring. For applications wherein the possibility of severing a wire line (not shown) in the flow passage 82 exists, the use of very powerful springs 7 as well as the need to provide adequate severing force as the gate 35 is closed on the wire line results in a high degree of required spring precompression which can make field assembly both difficult and expensive.

By holding the precompressed spring 7 captive within the housing 8', a field repair technician may disassemble and reassemble the actuator according to the invention without the need for specialized equipment or other tools for linearly compressing the volute spring 7. The housing retaining means 96 are comparable in simplicity and ease of use to the alternative means 3, 4 shown in FIG. 1 and may be considered as equivalence for functional purposes.

It is to be noted that the drawing figures and foregoing discussion have been directed toward what Applicant believes is the best mode for carrying out the subject invention. As such, the disclosure and drawing figures should be interpreted in an illustrative and not a limiting sense. It should further be noted that although the invention has been disclosed in conjunction with a gate valve, the actuator according to the present invention is equally useful with other types of valves utilizing a rising stem or other linearly reciprocable operating member. Likewise, although the gate valve shown and discussed herein was of the type which was opened to full material flow when the stem is fully inserted and closed to material flow when the stem is outwardly withdrawn, it would be equivalent to employ the actuator according to the present invention with a gate valve in which the opposite was true. In such a case as this, the valve would "fail open" upon loss of control pressure, being possibly used for dispensing fire extinguishing material or for safely venting a pressure tank.

Further, although discussed in terms of a hydraulic piston responsive to the presence or absence of pressurized control fluid or gas, the actuator according to the present invention may equivalently employ any of a variety of means for urging the valve stem 9 either inward or outward responsive to the presence or absence of a control influence, including for example electrical, magnetic, heat responsive, weight responsive, etc. Further, the control influence as used hereinabove, need not necessarily originate from a source controlled by a human or computer operator, but includes any physical phenomenon or property suitable for influencing the urging means, including, but not limited to, atmospheric pressure, liquid or gas pressure in the material flow passage 82, electrical current flow, actuator orientation with respect to the gravity vector, viscosity or velocity of a flowing fluid or gas, etc. Both these and other equivalent structures will be apparent to those skilled in the relevant art upon careful review of the foregoing specification and the appended claims and drawing figures.

We claim:

1. A fail-safe gate valve, comprising:
    a valve body having a flow passage disposed therein for conducting a flowing stream of material therethrough, the valve body further having a cavity disposed therein, the cavity opening at one end thereof transversely into the flow passage and at the other end thereof at the surface of the valve body;
    a bonnet, sealingly secured to the valve body about the other end of the cavity opening, the bonnet further including a central bore therethrough opening into the cavity on one end thereof;
    an elongated stem, disposed within the central bore and axially reciprocatable in first and second directions therethrough, the stem having an inner end terminating within the cavity and an outer end terminating exterior to the valve body and bonnet;
    a gate member, engaged with the stem at the inner end thereof and reciprocating therewith, and located to be movable transverse said flow passage for regulating the flowing stream of material in response to the axial reciprocation of the stem;
    means, cooperating with the bonnet, for urging the stem axially in the firsts direction responsive to the presence of a source of pressurized liquid or gas;
    said means for urging the stem axially including a hollow cylinder having a first closed end secured to the axially outward end of the stem, the cylinder further extending axially outward from the stem and having a second open end;
    a volute spring, disposed about the valve stem and being axially compressible responsive to axial motion of the stem in the first direction, for driving the stem axially in the second direction upon removal of the control influence;
    said bonnet sealingly secured to the valve body by a plurality of bonnet retaining nuts disposed circumferentially about the central bore, and further comprising:
    a removable lock ring, circumferentially engaged with the bonnet and extending radially outwardly therefrom;
    a bonnet adapter ring, abuttingly engaged with the valve body side of the lock ring and threadably engaged to the housing for releasably securing the housing to the bonnet for preventing relative movement therebetween, the bonnet adapter ring further being movable toward the valve body upon disengagement from the housing for permitting free access to the bonnet retaining nuts.

2. A fail-safe gate valve, comprising:
    a valve body having a flow pasage disposed therein for conducting a flowing stream of material therethrough, the valve body further having a cavity disposed therein, the cavity opening at one end thereof transversely into the flow passage and at the other end thereof at the surface of the valve body;

a bonnet, sealingly secured to the valve body about the other end of the cavity opening, the bonnet further including a central bore therethrough opening into the cavity on one end thereof;

an elongated stem, disposed within the central bore and axially reciprocatable in first and second directions therethrough, the stem having an inner end terminating within the cavity and an outer end terminating exterior to the valve body and bonnet;

a gate member, engaged with the stem at the inner end thereof and reciprocating therewith, for regulating the flowing stream of material in response to the axial reciprocation of the stem;

means, cooperating with the bonnet, for urging the stem axially in the first direction responsive to the presence of a source of pressurized liquid or gas;

said means for urging the stem axially inward including a hollow cylinder having a first closed end secured to the axially outward end of the stem, the cylinder further extending axially outward from the stem and having a second open end;

a hollow piston of generally cylindrical shape oriented colinearly with the cylinder, the piston being closed at the first outer end and being open at a second, inner end, the piston further being sealingly axially telescopingly receivable within the cylinder for forming a control volume therewithin;

a housing, secured to the bonnet and surrounding the valve stem, cylinder, piston, and the volute spring, the housings further being supportively secured to the piston for preventing any movement thereof relative to the bonnet;

a volute spring, disposed about the valve stem and being axially compressible responsive to axial motion of the stem in the first direction, for driving the stem axially in the second direction upon removal of the control influence;

means for retaining the volute spring within the housing in a precompressed state when the housing is removed from the bonnet, including an annular locking groove, disposed in the housing and opening radially inward, the groove being disposed axially inward with respect to the volute spring, and a spring ring, engageable with the locking groove and extending radially inward from therewithin, for blocking axially inward movement of the volute spring, and wherein the volute spring is precompressed prior to any axially motion of the stem in the first direction.

3. A fail-safe gate valve as recited in claim 2, wherein the volute spring retaining means further includes an annular shoulder, disposed in the axially outward end of the housing and extending radially inward therefrom, for blocking axially outward movement of the volute spring.

4. A fail-safe gate valve as recited in claim 3, further comprising an annular base plate, disposed about the valve stem between the volute spring and the spring ring, for transferring axial force therebetween.

5. A fail-safe gate valve as recited in claim 3, further comprising an annular upper spring retainer, contacting the axially outward end of the volute spring and normally being engaged with a radially outwardly extending shoulder disposed in the reciprocating cylinder, the cylinder shoulder and the upper spring retainer cooperatively engaged for blocking relative outward axial movement of the upper spring retainer past the cylinder shoulder, the upper spring retainer further being of sufficient radial size to engage the housing shoulder for blocking axial outward movement of the volute spring.

* * * * *